(12) United States Patent
Dossena et al.

(10) Patent No.: US 6,450,503 B1
(45) Date of Patent: Sep. 17, 2002

(54) BOX-TYPE SEAL ASSEMBLY, IN PARTICULAR FOR VEHICLE AXLES

(75) Inventors: Luigi Dossena, Milan; Rodolfo Sbampato, Brugherio, both of (IT)

(73) Assignee: Rolf S.p.A., Cologno Monzese (IT)

( * ) Notice: Subject to any disclaimer, the term of this patent is extended or adjusted under 35 U.S.C. 154(b) by 0 days.

(21) Appl. No.: 09/718,872

(22) Filed: Nov. 22, 2000

(51) Int. Cl.$^7$ ................................................ F16J 15/32
(52) U.S. Cl. ........................ 277/572; 277/549; 277/564; 277/562; 277/582
(58) Field of Search ................................ 277/549, 550, 277/562, 564, 554, 565, 582, 349, 353

(56) References Cited

U.S. PATENT DOCUMENTS

| | | | |
|---|---|---|---|
| 3,022,081 A | * 2/1962 | Kosatka | 277/353 |
| 4,428,586 A | 1/1984 | Romero | |
| 4,856,794 A | * 8/1989 | Boyers et al. | 277/571 |
| 5,096,207 A | 3/1992 | Seeh et al. | |
| 5,183,269 A | 2/1993 | Black et al. | |
| 5,201,528 A | * 4/1993 | Upper | 277/394 |
| 6,168,165 B1 | * 1/2001 | Sabo' | 277/562 |
| 6,213,476 B1 | * 4/2001 | Chandler | 277/569 |
| 6,315,296 B1 | * 11/2001 | Oldenburg | 277/353 |

FOREIGN PATENT DOCUMENTS

FR 2695 703 3/1994

* cited by examiner

*Primary Examiner*—Anthony Knight
*Assistant Examiner*—Michael Wayne White
(74) *Attorney, Agent, or Firm*—Morgan & Finnegan LLP

(57) ABSTRACT

A seal assembly to be inserted between two members in relative rotation, including a bushing that is fitted to the first member and is connected with a gasket, wherein both connections form fluid-tight seals. The gasket includes a rigid reinforcement that is fitted via a fluid-tight seal to the second member and a first sealing member, which is made of an elastomeric material and provided with a first annular lip. The first annular lip contacts the sleeve-type coupling portion of the bushing, which is mounted coaxially with the first lip. The portion of the reinforcement facing the bushing is provided with a seat in which a rigid ring made of an oxidation-resistant material is mounted. The rigid ring extends in front of the flange portion of the bushing, which carries a second sealing member made of an elastomeric material. The sealing member is provided with two axially extending lips which axially and radially contact portions of the ring.

8 Claims, 1 Drawing Sheet

BOX-TYPE SEAL ASSEMBLY, IN PARTICULAR FOR VEHICLE AXLES

The present invention relates to a seal assembly of the so-called box type, designed to be inserted between two members in relative rotation, in particular between an axle, for example the axle of an industrial vehicle, and a seat through which the axle passes, in order to close with a fluid-tight seal the seat within which are normally housed the rolling bearings which support the axle (if this is of the rotating type), or else which support the wheel hubs rotating on the axle, the said axle, in this latter case, being anchored fixed to the chassis of the vehicle. Also housed inside the seat is the grease necessary for lubrication of the bearings.

BACKGROUND OF THE INVENTION

Known seal assemblies of the type referred to above include a bushing that can be fitted to the axle in such a way that it is fixed thereto and is fluid-tight, and a gasket that includes a metal reinforcement which can be fitted in a fluid-tight way in the seat, and a seal member made of elastomeric material (rubber) and provided with a plurality of annular lips, the main one of which is loaded by a garter spring and co-operates radially in a sliding way with a sleeve-type coupling portion of the bushing on the axle. The bushing is further provided, on the end opposite to the direction of its introduction into the seat, with a flange portion which carries additional sealing lips, called dust lips in that they face towards the outside of the seat. In this way, the dust lips and the flange portion of the bushing prevent external contaminants (water, dust, mud, etc.) from penetrating inside the seal assembly and thus damaging the main lip. Since the latter lip remains facing the lubricating grease, it prevents the said grease from coming out and is at the same time lubricated thereby in order to reduce sliding friction on the sleeve portion of the bushing on which it exerts a dynamic sealing action Seal assemblies of the type referred to above are quite satisfactory but present a number of drawbacks. In particular, the part of the reinforcement that faces towards the outside of the seat, and is thus in direct contact with external contaminants, is easily oxidized, so that the dust lips get damaged. The dust lips lose their sealing action, so leading to the main lip getting damaged and to the seal gasket becoming unserviceable. On the other hand, fabrication of the entire reinforcement using oxidation-resistant materials would from one standpoint be too costly and from the other standpoint could create problems of adhesion to the elastomeric sealing member, which is usually fixed so that it is integral with the reinforcement by a process of vulcanization-phase bonding. Also the making of the reinforcement with a number of elements made of different materials is problematical in that the problem of obtaining reciprocal fixing of these elements in an economic way and without any damage would have to be solved. Finally, the sealing action of the dust lips is not always very efficient, and in the long run this brings about damaging of the gasket in any case.

SUMMARY OF THE INVENTION

The object of the present invention is thus that of improving the known box-type seal assemblies, ensuring a longer duration of the gasket, at the same time cutting down on overall dimensions and on costs.

According to the present invention, it is provided a seal assembly able to be inserted between two members in relative rotation, in which a bushing able to be fitted in a fixed and fluid-tight way to a first one of said members co-operates in a fluid-tight way with a gasket which comprises a substantially rigid reinforcement able to be coupled in a fluid-tight way to a second of said members, and a first sealing member carried by the reinforcement so that it is integral with the latter, the said first sealing member being made of elastomeric material and being provided with a first annular lip co-operating radially in a sliding way with a sleeve-type coupling portion of the bushing, which is mounted coaxially with the first lip and with a corresponding sleeve-type coupling portion of the reinforcement; characterized in that one face of the sleeve portion of the reinforcement facing the bushing is provided, on the side opposite to the said first lip, with a seat in which a substantially rigid ring is mounted in a blocked way, the ring being made of an oxidation-resistant material and extending substantially in front of a flange portion of the bushing, which in turn carries, integral with it, a second sealing member made of elastomeric material, the said second sealing member being provided with at least one annular lip co-operating in a sliding and fluid-tight way with a sealing surface of the said ring.

As compared to the known solutions, the seal assembly according to the present invention presents numerous advantages. In the first place, the annular lip carried by the flange portion of the bushing (i.e., the lip most exposed to the action of the external agents) does not co-operate in a sliding way directly with the reinforcement of the gasket, but with the ring made of oxidation-resistant material, which, albeit coming into direct contact with the external contaminants, is not oxidized, and consequently does not damage the lip that slides on it. As a result, the latter lip remains efficient for a long time, so preserving the sealing member of the gasket, which in turn will have a longer service life. In addition, the ring made of oxidation-resistant material constitutes only one small part of the reinforcement of the gasket, which is instead made, as a whole, of traditional materials, and hence at a contained cost, and without creating any problem of adhesion of the corresponding sealing member made of elastomeric material. On the other hand, also the assembly of the ring on the reinforcement is, according to the invention and as will be clarified in what follows, extremely simple and economical, and is achieved without any risk of damage to the various components of the seal assembly.

In addition, the seal assembly according to the invention ensures a far more efficient sealing action than do known solutions, owing to the presence of a number of annular lips operating in different directions, the said seal assembly presenting at the same time extremely contained overall dimensions. The seal assembly according to the invention may, in fact, comprise, as will emerge from the ensuing description, sealing lips acting both in an axial direction and in a radial direction in opposite senses.

BRIEF DESCRIPTION OF THE DRAWINGS

These and other advantages of the invention will emerge clearly from the ensuing description of some non-limiting embodiments of the invention, given with reference to the figures of the attached drawing, in which.

DETAILED DESCRIPTION OF THE INVENTION

Figure 1:
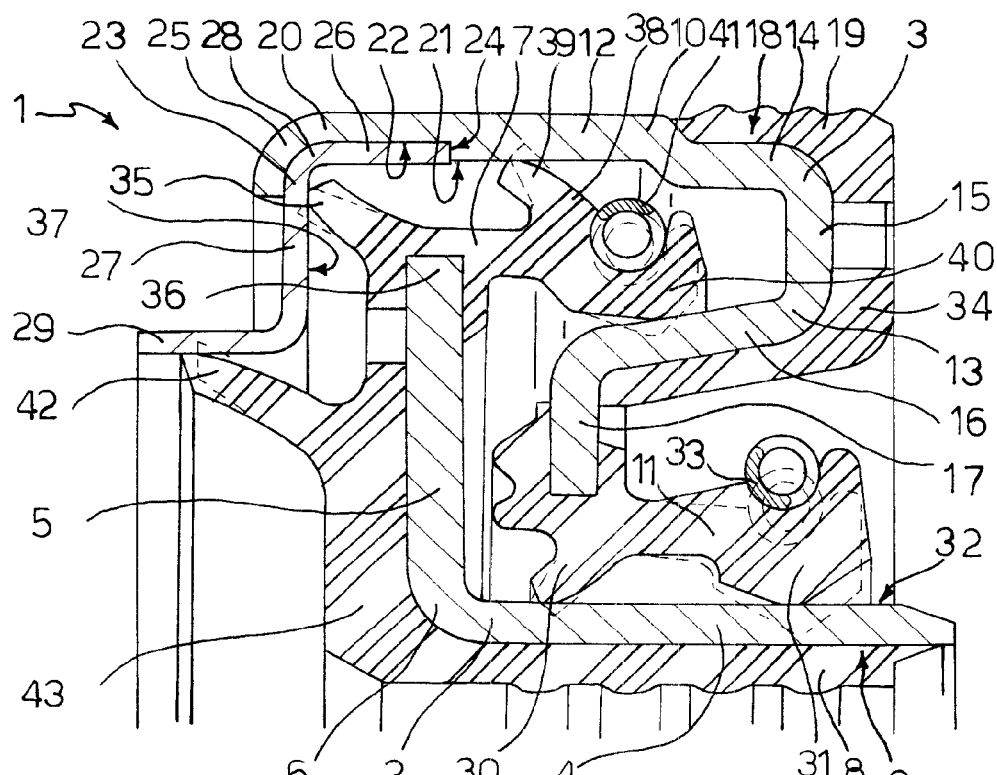
FIG. 1 is a radial cross-sectional view of a seal assembly according to the present invention.

With reference to FIG. 1, a seal assembly 1 of the so-called box type, which may be inserted between two mechanical members in relative rotation (not illustrated for reasons of simplicity), comprises a bushing 2, which is fitted in a fixed and fluid-tight way to a first one of the mechanical members in relative rotation, and a gasket 3, which is fitted in a fluid-tight way to a second one of the mechanical members in relative rotation and co-operates in a fluid-tight way with the bushing 2.

For instance, the seal assembly 1 could be inserted between an axle, for example the axle of an industrial vehicle, and a seat through which the axle passes, within which are housed the bearings that support the axle, and within which a lubricating fluid necessary for lubrication of the bearings is present. The seal assembly 1 thus has the function of sealing in a fluid-tight way the said seat. In what follows, just to provide a non-limiting example, reference will be made to a situation of this type, in which the bushing 2 is mounted so that it is fixed on an axle of a vehicle, and the gasket 3 is mounted so that it is integral with the seat of the axle.

The bushing 2 comprises a coupling portion 4 shaped like a sleeve, which can be coupled in a known way to the corresponding mechanical member (axle), and a radially external flange portion 5 which extends radially so that it projects from one longitudinal end 6 of the coupling portion 4. The flange portion 5 carries, so that it is fixed to it (connected in any known way to the flange portion, for example by means of a vulcanization-phase bonding process), a sealing member 7 made of elastomeric material. Preferably, as illustrated in FIG. 1, the sealing member 7 extends so as to constitute a coating layer 8 on a radially internal side surface 9 of the coupling portion 4 in such a way that the bushing 2 is fitted so that, in use, it is integral with the respective mechanical member with interposition of the coating layer 8. Preferably, in addition, the coating layer 8 presents, in undeformed conditions, a succession of raised and depressed portions.

The gasket 3 comprises a basically rigid reinforcement 10, for example made of metal, and a sealing member 11 which is carried by the reinforcement 10 so that it is integral with the latter, the sealing member 11 being made of an elastomeric material and being fixed to the reinforcement 10 in a known way (for example, by means of a process of vulcanization-phase bonding). In particular, the reinforcement 10 comprises a sleeve portion 12 for coupling in a fixed way to the respective mechanical member (seat of axle), the sleeve portion 12 being set basically coaxial and concentric to the coupling portion 4 of the bushing 2, and a radially internal flange portion 13 extending radially projecting from one axial end 14 of the sleeve portion 12 towards the bushing 2. The flange portion 13 is shaped, in radial cross section, basically like an S, and thus in turn comprises, starting from one of its ends for attachment to the sleeve portion 12, a first radially extending portion 15, an oblique intermediate portion 16, and a second radially extending portion 17, the latter facing the flange portion 5 of the bushing 2 and having one of its free ends facing the coupling portion 4 of the bushing 2. The axial end 14 of the sleeve portion 12 is radially offset with respect to the sleeve portion 12 itself and thus defines a radially external annular seat 18 within which is inserted an insert 19 made of elastomeric material to provide a radial-interference fit with the mechanical member on which the reinforcement 10 is mounted.

The sleeve portion 12 of the reinforcement 10 extends axially with one of its axial ends 20, opposite to the axial end 14, beyond the flange portion 5 of the bushing 2 and presents, on one of its faces 21, which is radially internal (and hence facing the bushing 2), a seat 22 in which a ring 23 is mounted in a blocked way, the said ring being substantially rigid and made of an oxidation-resistant material.

In the non-limiting example illustrated in FIG. 1, the ring 23 is mounted press-fitted into the seat 22 and axially blocked against a shoulder 24 of the seat 22 provided towards the axial end 14 by means of an end rim 25 of the sleeve portion 12, which is opposite to the shoulder 24 and bent back substantially at right angles with respect to the sleeve portion 12. Preferably the ring 23 is made of stainless steel and, in radial cross section, substantially has the shape of a straight right "S" including one first cylindrical portion 26 for coupling with the seat 22, one radially extending plane portion 27 set substantially perpendicular to the first cylindrical portion 26 and connected to the latter by means of a curved portion 28 bent at an angle, for example, substantially a right angle, and a second cylindrical portion 29 extending axially from one end of the radially extending plane portion 27 opposite to the curved portion 28 and on the side opposite to the first cylindrical portion 26. The ring 23 extends with its own radially extending plane portion 27 substantially in front of the flange portion 5 of the bushing 2. Preferably, moreover, the bent-back end rim 25 is obtained by plastic deformation subsequent to the insertion of the ring 23 in the seat 22 by calking of the end rim 25 against the curved portion 28 of the ring 23.

The sealing member 11 of the reinforcement 10 extends from the free radial end of the radially extending portion 17 towards the coupling portion 4 of the bushing 2 and comprises, according to a substantially known solution, two annular lips 30, 31 radially co-operating, in use, in a sliding way with a radially external side surface 32 of the bushing 2 (and precisely of the coupling portion 4). The annular lip 30 (which has a prevalently dust-protection function) is fitted, with pre-set mounting radial interference (its undeformed configuration being the one illustrated by a dashed line in FIG. 1), to the bushing 2, whilst the annular lip 31 (which prevalently has the function of seal) is, in radial cross section, substantially V-shaped and is kept pressed against the bushing 2 not only by a radial interference that is preset at assembly (its undeformed configuration being the one illustrated by a dashed line in FIG. 1), but also by a garter spring 33.

Clearly, the sealing member 11 can extend, as is illustrated in FIG. 1, so as to comprise the insert 19, to which it may, for example, be connected by means of a connecting portion 34 set on one side surface of the flange portion 13.

The sealing member 7 of the bushing 2 comprises an annular lip 35 axially extending so that it projects from a free end 36 of the flange portion 5 towards the radially extending plane portion 27 of the ring 23. In use, the annular lip 35 cooperates in a sliding and fluid-tight way, with axial interference, with a sealing surface 37 of the radially extending plane portion 27 of the ring 23, the said radially extending plane portion 27 facing the flange portion 5, against which it is held as a result of an axial deformation at assembly (the undeformed configuration of the annular lip 35 being the one illustrated by a dashed line in FIG. 1).

From the free end 36 of the flange portion 5 there extends from the end axially opposite to the annular lip 35, a portion 38 of the sealing member 7 provided with two further annular lips 39, 40, which extend radially from the portion 38 on opposite ends one with respect to the other so as to cooperate, in a sliding, fluid-tight way and with radial interference, respectively with the sleeve portion 12 and the oblique intermediate portion 16 of the flange portion 13, whilst the annular lip 39 is mounted with pre-set radial interference up against the sleeve portion 12 (its undeformed configuration being the one shown by a dashed line in FIG. 1), and the annular lip 40, which is basically V-shaped in radial cross section, is held pressed up against the oblique intermediate portion 16 not only by a pre-set radial interference at assembly (its undeformed configuration being the one illustrated by a dashed line in FIG. 1), but also by a garter spring 41.

The sealing member 7 further comprises another annular lip 42 which extends axially projecting from the flange portion 5, substantially parallel and in the same direction as the annular lip 35 and at such a distance from the latter as to co-operate, in a sliding way and with interference in a radial direction, with the cylindrical portion 29 of the ring 23 (the undeformed configuration of the annular lip 42 being the one illustrated by a dashed line in FIG. 1). The annular lip 42 co-operates with the cylindrical portion 29 in a sense opposite to the one of co-operation of the annular lip 40 with the oblique intermediate portion 16. The sealing member 7 extends, as has already been mentioned, to form the coating layer 8 to which the annular lip 42 is connected by a portion 43 which covers a face of the flange portion 5 facing the radially extending plane portion 27 of the ring 23.

Advantageously, but not exclusively, the seal assembly 1 according to the invention is mounted in such a way that the sealing member 11, carried by the gasket 3, is set facing towards the inside of the axle seat for closing which the seal assembly 1 is designed, i.e., on the side of a lubricating fluid contained inside the said seat (the said fluid may thus lubricate also the annular lip 31). Instead, the ring 23 is set outside the axle seat that is closed by the seal assembly 1, in direct contact with the external agents, and the annular lips 42 and 35 are set facing the outside of the said seat.

Figure 2:
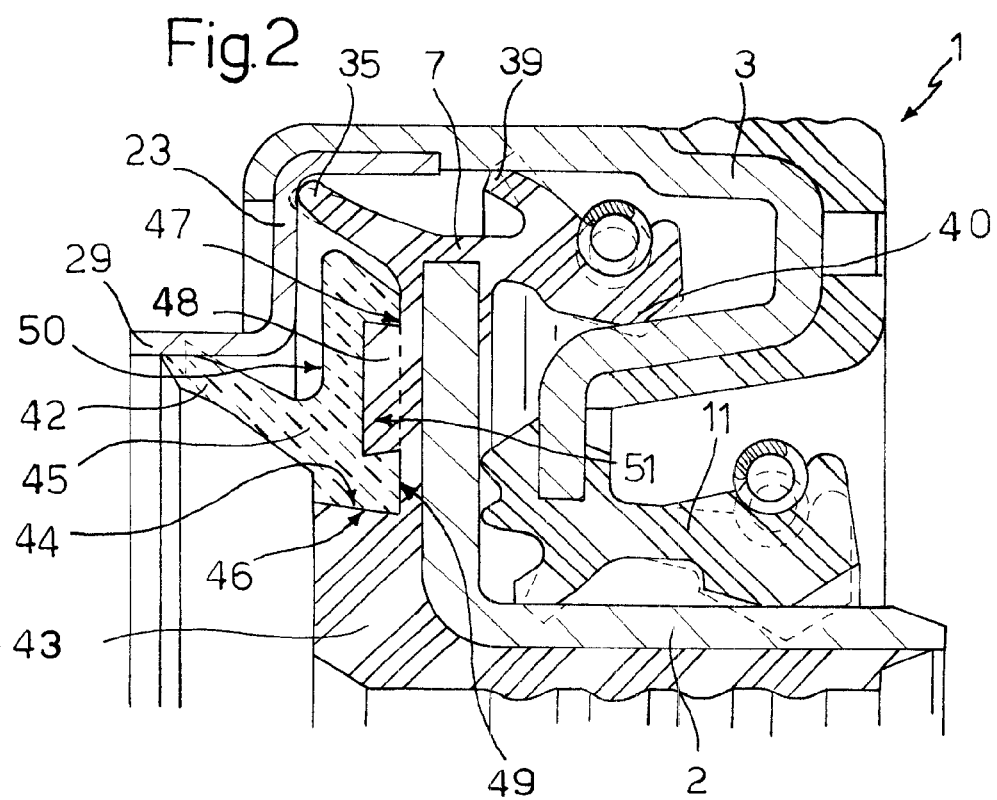
FIG. 2 illustrates a possible variant of the seal assembly of FIG. 1.

According to the variant illustrated in FIG. 2, in which details that are similar to or the same as the ones already described are designated by the same reference numbers, the annular lip 42, which co-operates in the radial direction with the cylindrical portion 29 of the ring 23, is made of a material different from, and more rigid than, that of the annular lips 35, 39, 40, for example a polyurethane. In this case, the sealing member 7 is still basically shaped as described previously with reference to FIG. 1, but its portion 43 is provided with an annular coupling seat 44 for snap-action insertion of an annular insert 45, the said annular insert being made of a material different from and more rigid than the material of which the sealing member 7 is made. In the non-limiting example illustrated in FIG. 2, the coupling seat 44 is defined by a radial shoulder 46 which is obtained on a front surface of the portion 43 of the sealing member 7 and is set preferably slightly inclined with respect to the axial direction. From a bottom surface 47 of the coupling seat 44, a dovetail annular tenon 48 extends axially.

The insert 45 is basically shaped like a ring delimited on two opposite sides 49, 50. On the side 49, a circumferential groove 51 is obtained which is designed to provide a snap-action coupling with the annular tenon 48. On the side 50 there extends, instead, in an axial direction, the annular lip 42, which is thus made of one and the same piece with the insert 45 and which co-operates, as has been described with reference to FIG. 1, in a sliding way and with interference in a radial direction, with the cylindrical portion 29 of the ring 23 (the undeformed configuration of the annular lip 42 being, also in this case, the one illustrated by a dashed line in FIG. 2).

In this way, the annular lip 42, which is the outermost and consequently the one most subject to possible damage, can be made separately and of the most suitable material (which may even be quite costly), whereas, for the annular lips 35, 39 and 40 of the same sealing member 7, which are the ones less subject to stress, a traditional elastomer is used. The snap-action mounting of the insert 45 on the sealing member 7 moreover enables a simple and economic assembly and possibly an easy and fast replacement of the component.

It is in any case clear that numerous modifications and variations may be made to the seal assembly described and illustrated herein without thereby departing from the scope of the present invention.

What is claimed is:

1. A seal assembly (1) insertable between two members in relative rotation, in which a bushing (2) able to be fitted in a fixed and fluid-tight way to a first one of said members co-operates in a fluid-tight way with a gasket (3) which comprises a substantially rigid reinforcement (10) able to be coupled in a fluid-tight way to a second of said members, and a first sealing member (11) carried by the reinforcement (10) so that it is integral with the latter, said first sealing member (11) being made of elastomeric material and being provided with a first annular lip (31) co-operating radially in a sliding way with a sleeve-type coupling portion (4) of the bushing (2), which is mounted coaxially with the first lip (31) and with a corresponding sleeve-type coupling portion (12) of the reinforcement (10), the bushing (2) comprising a flange portion (5) which in turn carries, so that it is fixed thereto, a second sealing member (7) made of elastomeric material, provided with a second annular lip (35); wherein one radially internal face (21) of the sleeve portion (12) of the reinforcement (10) facing the bushing (2) is provided, on the side opposite to said first lip (31), with a seat (22) in which a substantially rigid ring (23) is mounted in a blocked way, the ring (23) being made of an oxidation-resistant material and extending substantially in front of said flange portion (5) of the bushing (2); said ring (23) in radial cross section, substantially having the shape of a straight right S, said ring including: one first cylindrical portion (26) for coupling with the seat (22), one radially extending plane portion (27) set substantially perpendicular to the first cylindrical portion (26), and one second cylindrical portion (29) extending axially from said radially extending plane portion (27), on the side opposite to said first cylindrical portion (26); said second annular lip (35) projecting axially from a free end (36) of said flange portion (5) of the bushing (2) towards said radially extending plane portion (27) of the ring (23) to cooperate in a sliding and fluid-tight way, with axial interference, with a surface (37) of the radially extending plane portion (27) of said ring (23) that faces said flange portion (5); a third annular lip (42) axially projecting from said flange portion (5) of the bushing (2) substantially parallel and in the same direction as said second annular lip (35) and at such a distance from the latter as to cooperate, in a sliding and fluid-tight way and with interference in the radial direction with said radial inwardly facing lateral surface of the second cylindrical portion (29) of the ring (23).

2. A seal assembly according to claim 1, wherein said ring (23) is provided on the radially innermost surface of the sleeve portion of gasket (3) and extends axially from the end opposite to the bushing (2) and out of said seat (22) to which the ring (23) is interference mounted, axially blocked against a shoulder (24) thereof, said shoulder (24) being provided towards said first lip (31) by means of an end rim (25) of the sleeve portion (12) opposite to said shoulder (24), which end rim (25) has been bent back substantially at right angles against a curved portion (28) of said ring (23)

connecting said first cylindrical portion (26) of the ring (23) with said radially extending plane portion (27) of said ring (23).

3. A seal assembly according to claim 2, wherein said bent-back end rim (25) has been obtained by plastic deformation subsequent to insertion of the ring (23) in the seat (22).

4. A seal assembly according to claim 2, wherein said second sealing member (7) further comprises a fourth (39) and a fifth (40) annular lip co-operating, in a sliding and fluid-tight way and with radial interference, respectively with said sleeve portion (12) of the reinforcement (5) and, on the opposite side, with an oblique intermediate portion (16) of a respective flange portion (13) of the reinforcement (5), said flange portion, which is S-shaped in radial cross section, extending at the sleeve portion (4) of the bushing (2) and carrying, at one of its radial ends, the said first lip (31).

5. A seal assembly according to claim 4, wherein said first lip (31) and said fifth lip (40) are substantially V-shaped in radial cross section and are loaded by respective garter springs which press said lips, along the same direction, against said sleeve portion (4) of the bushing (2) and said oblique intermediate portion (16) of the reinforcement (3), respectively.

6. A seal assembly according to claim 2, wherein said third annular lip (42) co-operates with said second cylindrical portion (29) of the ring (23) in a direction opposite to that of co-operation of the fifth lip (40) with the oblique intermediate portion (16) of the reinforcement (3).

7. A seal assembly according to claim 1, wherein said third annular lip (42) is made of a material different from that of the other said lips, and of a material that is more rigid, for example a polyurethane.

8. A seal assembly according to claim 7, wherein said third lip (42) is made of a single piece with, and projects from, an insert (45) snap-coupled onto said second sealing member (7), said third lip (42) being mounted on a dovetail annular tenon (48) provided in axial direction in correspondence with a radial shoulder (46) of the second sealing member (7).

* * * * *